(12) United States Patent
Valdevit et al.

(10) Patent No.: US 7,769,902 B2
(45) Date of Patent: Aug. 3, 2010

(54) TOPOLOGY DATABASE SYNCHRONIZATION

(75) Inventors: Ezio Valdevit, Redwood City, CA (US); Vineet Abraham, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 2323 days.

(21) Appl. No.: 10/210,019

(22) Filed: Jul. 31, 2002

(65) Prior Publication Data

US 2004/0024908 A1  Feb. 5, 2004

(51) Int. Cl.
*G05F 15/16* (2006.01)
(52) U.S. Cl. .................................................. 709/248
(58) Field of Classification Search ......... 709/238–240, 709/234–237, 248
See application file for complete search history.

(56) References Cited

U.S. PATENT DOCUMENTS

| | | | |
|---|---|---|---|
| 3,773,530 A | | 11/1973 | Morgan |
| 4,106,946 A | | 8/1978 | Ritze |
| 4,302,678 A | | 11/1981 | Schiffert |
| 5,483,536 A | * | 1/1996 | Gunji et al. ................. 370/403 |
| 5,550,818 A | * | 8/1996 | Brackett et al. ........ 370/395.51 |
| 5,566,014 A | * | 10/1996 | Glance ......................... 398/83 |
| 6,123,872 A | | 9/2000 | Yamazaki et al. |
| 6,178,172 B1 | * | 1/2001 | Rochberger ............ 370/395.32 |
| 6,667,259 B2 | | 12/2003 | Clasen et al. |
| 6,770,220 B1 | | 8/2004 | Klimant |
| 2005/0054515 A1 | | 3/2005 | Kolberg et al. |

FOREIGN PATENT DOCUMENTS

| | | |
|---|---|---|
| DE | 20 2004 002 064.5 | 4/2004 |
| WO | WO 01/59503 A2 | 8/2001 |
| WO | WO 02/077620 A1 | 10/2002 |

OTHER PUBLICATIONS

NCITS 321-200x Switch Fabric-2 Rev 4.9, Nov. 14, 2000, pp. 97-116.

* cited by examiner

*Primary Examiner*—Vivek Srivastava
*Assistant Examiner*—Mitra Kianersi
(74) *Attorney, Agent, or Firm*—Conley Rose, P.C.

(57) ABSTRACT

A network comprises a plurality of interconnected switches that implement a topology database synchronization technique in which each switch determines whether its topology database has already been transmitted to a neighboring switch when a new link is formed to the neighboring switch. When a new electrical connection is detected, the local switch determines whether any of its other ports have already been connected to the same neighboring switch. If no other port on the local switch has been connected to the neighboring switch, the local switch transmits its topology database to the neighboring switch. If the local switch determines that it has already been connected to the neighboring switch via another one of its ports, the local switch does not yet again copy of the database to the neighboring switch. Also, link state record updates are propagated via only one inter-switch link to a neighboring switch, not all possible links.

29 Claims, 3 Drawing Sheets

FIG. 2

| DOMAIN IDENTIFIER = "20" | | | |
|---|---|---|---|
| NEIGHBOR | LOCAL PORT | REMOTE PORT | COST |
| 22 | 1 | 7 | 1000 |
| 22 | 3 | 5 | 1000 |
| 22 | 4 | 9 | 1000 |
| 22 | 6 | 12 | 1000 |
| 26 | 5 | 1 | 1000 |
| 26 | 7 | 2 | 1000 |
| 26 | 10 | 3 | 1000 |
| 26 | 2 | 8 | 1000 |
| 28 | 9 | 9 | 1000 |

LSR 21

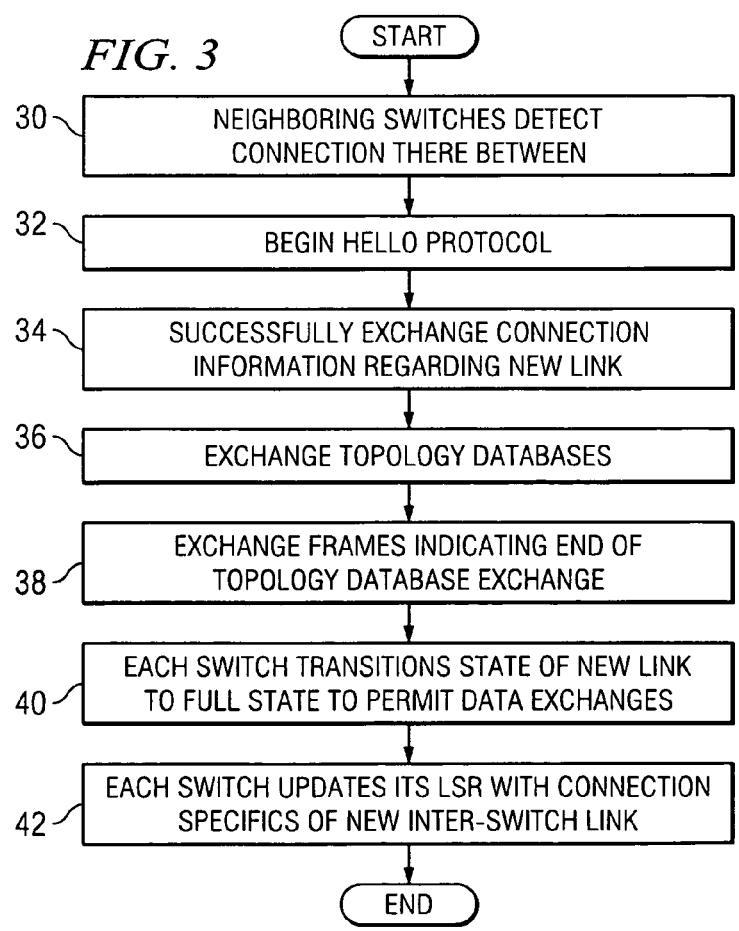

FIG. 3

START
↓
30 — NEIGHBORING SWITCHES DETECT CONNECTION THERE BETWEEN
↓
32 — BEGIN HELLO PROTOCOL
↓
34 — SUCCESSFULLY EXCHANGE CONNECTION INFORMATION REGARDING NEW LINK
↓
36 — EXCHANGE TOPOLOGY DATABASES
↓
38 — EXCHANGE FRAMES INDICATING END OF TOPOLOGY DATABASE EXCHANGE
↓
40 — EACH SWITCH TRANSITIONS STATE OF NEW LINK TO FULL STATE TO PERMIT DATA EXCHANGES
↓
42 — EACH SWITCH UPDATES ITS LSR WITH CONNECTION SPECIFICS OF NEW INTER-SWITCH LINK
↓
END

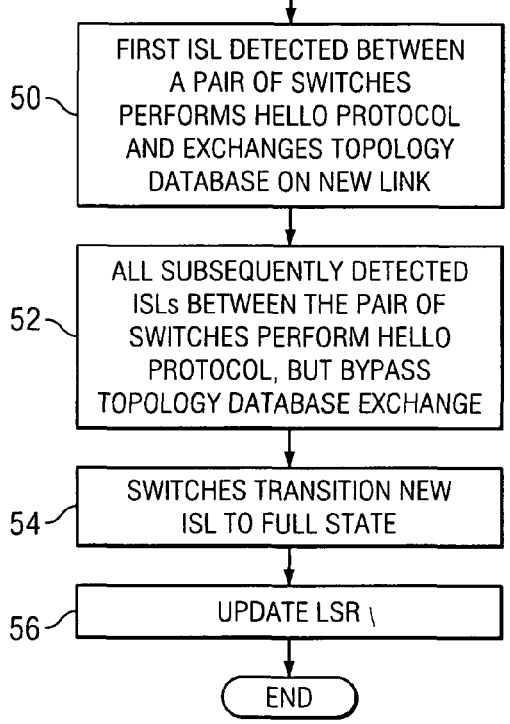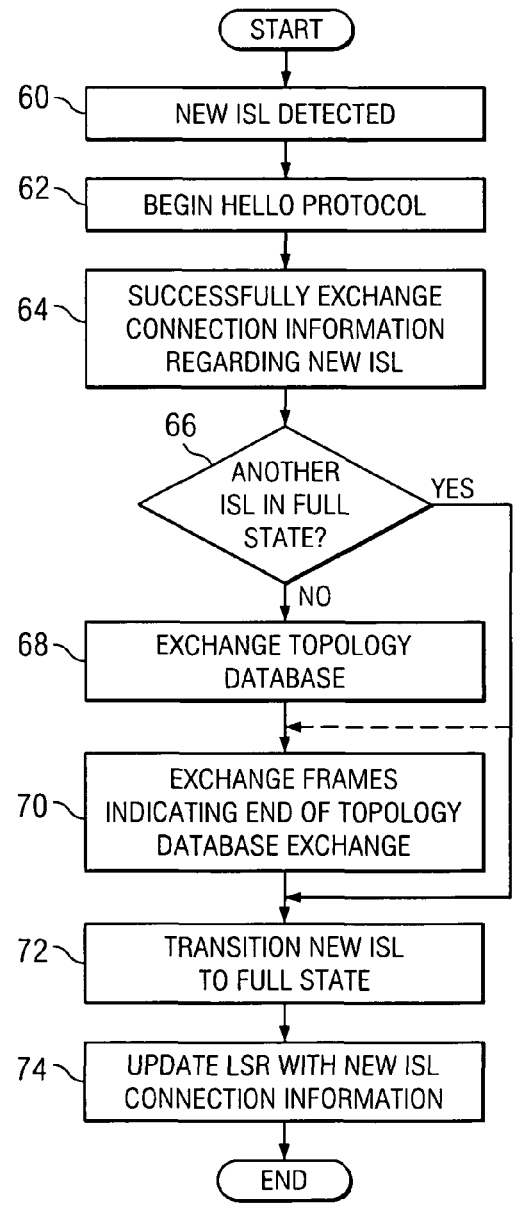

TOPOLOGY DATABASE SYNCHRONIZATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to computer networks. More particularly, the invention relates to electronic switches through which communications pass from one point in a network to another. Still more particularly, the invention relates to an improved technique for synchronizing topology databases between switches in a network.

2. Background Information

Initially, computers were most typically used in a standalone manner. It is now commonplace for computers and other types of computer-related and electronic devices to communicate with each other over a network. The ability for computers to communicate with one another has lead to the creation of networks ranging from small networks comprising two or three computers to vast networks comprising hundreds or even thousands of computers. Networks can be set up to provide a wide assortment of capabilities. For example, networks of computers may permit each computer to share a centralized mass storage device or printer. Further, networks enable electronic mail and numerous other types of services. Generally, a network's infrastructure generally comprises switches, routers, hubs and the like to coordinate the effective and efficient transfer of data and commands from one point on the network to another.

Networks often comprise a "fabric" of interconnected switches which are devices that route data packets from a source port to a destination port. FIG. 1 shows an exemplary switch fabric comprising switches 20, 22, 24, 26 and 28. Various devices including servers, storage devices, etc. connect to some or all of the switches. In FIG. 1, devices D1 and D2 connect to switch 20 and device D3 connects to switch 24. Through the fabric of switches, devices D1-D3 can communicate with each other by sending and receiving data frames. The switch fabric takes care of routing the data frames from the source to their intended destination.

The switches shown in FIG. 1 are interconnected by communication links typically referred to as inter-switch links ("ISLs"). As shown, switches 22 and 24 are connected by a single ISL 17, as are switches 24 and 26, switches 26 and 28, and switches 20 and 28. Switch 20 connects to switch 22 by four ISLs (identified collectively by numeral 19), as also is the case with switches 20 and 26. Multiple ISLs between a pair of switches increases the effective bandwidth between the switches and provides redundancy in the case of a link failure.

Each switch generates and maintains a link state record ("LSR"). The LSRs for switches 20-28 are shown as LSRs 21-29, respectively in FIG. 1. The LSRs are stored in memory 15 which is coupled to and accessible by a CPU 13 in each switch. Each LSR for a switch specifies how that switch is connected to its neighboring switches. Two switches connected directly via an ISL are referred to as "neighbors." For example, the neighbors of switch 20 are switches 22, 26 and 28, but not switch 24 because switch 24 does not connect via an ISL directly to switch 20. Switch 20 can communicate with switch 24 via either switch 22 or switch 26.

Each switch includes multiple ports and the ISLs are formed between ports of neighboring switches. Not all of a switch's ports need be used at any point in time. The switches in FIG. 1 may be, for example, 16 port switches. Switch 20 is shown as having nine ports (numbered 1-9) connected via ISLs to neighboring switches 22, 26 and 28, while switches 22 and 26 only use five and six, respectively, of their ports to connect to their neighbors.

As mentioned above, each switch's LSR specifies how the switch connects to its neighbors. The connectivity information in an LSR includes the switch's "domain identifier," and for each neighboring (i.e., remote) switch, the remote switch's domain identifier, remote port number and local port number. For example, as shown, port 1 of switch 20 connects to port 7 of switch 22. For purposes of this disclosure, the domain identifiers of each switch will be the reference numerals shown in the various figures. Thus, "20" is the domain identifier for switch 20, "22" is the domain identifier for switch 22, and so on. The connectivity information contained in the LSR 21 associated with switch 20 that describes the ISL between ports 1 and 7 of switches 20 and 22 will include remote domain identifier "22," local port number "1," and remote port number "7." This type of information is included in LSR 21 for each ISL between connecting switch 20 to a neighbor switch.

FIG. 2 shows an LSR 21 for switch 20. Each entry in the LSR pertains to a separate ISL and other information (e.g., age, incarnation number, etc.) may be included on the LSR. Because there are four ISLs to switch 22, four ISLs to switch 26 and one ISL to switch 28, the LSR 21 shown in FIG. 2 includes four entries pertaining to neighboring switch 22, four entries pertaining to neighboring switch 26 and one entry pertaining to neighboring switch 28. Each entry identifies the local and remote ports forming that ISL.

The last column in the LSR of FIG. 2 is labeled as "cost." Each ISL in the network is assigned a cost value that is arbitrary in magnitude, but inversely related to the bandwidth of the ISL. For example, a 1 gigabit per second ("gbps") link may be assigned a cost value of 1000, while a 2 gpbs link may be assigned a cost value one-half as much (i.e., 500). As such, lower costs indicate faster links. The switches in the network preferably determine a priori the lowest cost path between end points on the network by adding together the costs of the various links forming each possible path through the fabric and determining which path or paths has the lowest total cost. The lowest cost path is selected to be the path through which traffic is routed between end points. For example, there are three possible paths for traffic to take from device D1 to device D3 in FIG. 1. The three paths include switches 20-22-24, 20-26-24, and 20-28-26-24. Whichever path has the lowest total cost is the path assigned for traffic to be routed from device D1 to device D3. In FIG. 2, the cost values are all set at 1000, but in general the cost values can be different between the various entries in the LSR and be changed as desired.

For data frames to be routed accurately and efficiently through the fabric, each switch must be aware of the network's topology, that is, how all of the switches are connected together. Each switch initially only knows its connectivity information in its own LSR, and not the LSR information pertaining to the other switches in the fabric. Through a standardized synchronization process (described below), the switches exchange LSR information and propagate such information to other switches in the fabric. The collection of LSRs associated with two or more switches is referred to herein as the "topology database." The switches exchange their topology databases so that each switch can be made aware of how other switches in the network are connected together.

FIG. 3 depicts the standardized process for synchronizing the topology databases of the switches in the fabric. The process begins in step 30 when an ISL forms between a pair of switches. Each switch detects when a physical connection is made to a neighboring switch. In step 32, once a local switch detects one of its ports is connected to a neighboring switch, the local switch begins a "HELLO" protocol in which the switch sends HELLO messages to the neighboring switch. The HELLO message essentially announces the local switch's presence to the neighboring switch and includes connectivity information for use by the neighboring switch. Such connectivity information includes the local switch's domain, the local switch's port number used for the new ISL and, if known, the remote (i.e., neighboring) switch's domain and port number. These values are included in various fields in the HELLO message. At first, the local switch will not know the remote switch's domain and port number and thus fills those fields in with predetermined values such as all "F" hexadecimal values. The remote switch, once it detects the new connection also begins sending HELLO messages including the its domain and port numbers, leaving the other switch's domain and port numbers as all F's. Thus, as indicated in step 34, both switches provide each other their domain and port number.

Once the switches are informed of the neighbor's domain and port number, in step 36 the switches exchange their topology databases which includes the LSRs describing all of the ISLs each switch knows about. These databases may require more than one message frame to complete the transfer. Thus, in step 38 once a switch has sent all of its topology database to its new neighbor, the switch sends a final frame that is precoded to indicate to the neighbor that the neighbor has received all of the topology database. The neighbor generally will not proceed to the next state in its state machine until it receives this precoded end of database exchange sequence frame. Once the end of the database exchange sequence frame is received, the neighbor responds back with an acknowledgment frame indicating that it has received the entire topology database. In step 40 each switch then transitions the state of the new ISL to the FULL state to permit the ISL to be used for normal network traffic. Finally, each switch updates its own LSR to include the connectivity information regarding the newly established ISL and propagates the updated LSR via all other of its ports to all other neighboring switches.

Each port on a switch performs the process outlined above when physical connection from that port to a neighboring switch is detected. Because the state machine for each port is the same, the design of the switch is relatively straightforward. However, the database synchronization process described above is inherently inefficient because the same topology database is copied over each and every link between the same pair of switches. The database synchronization process works well when each switch has relatively few ports, but the inherent inefficiency becomes more troublesome as network switch technology progresses and the number of ports on each switch increases. Today's switches typically have 16 ports and 64 port switches are becoming available. Thus, although the current topology database synchronization process generally works well, like most technology, improvements are always welcome. Moreover, an improved topology database synchronization process is needed which avoids or mitigates the inefficiency described above.

When there is a change in the state of an ISL (addition of removal), the change is reflected in the LSR of the switches (addition or removal of an entry) that detects the change. For each change in the LSR of a switch, the switch needs to update its LSR and transmit the new LSR on all other ISLs. This is also inefficient and becomes troublesome as networks become larger and the port count on the switches increase. Today's switches typically have 16 ports and 64 port switches are becoming available. Thus, although the current LSR update process generally works well, like most technology, improvements are always welcome. Moreover, an improved LSR update process is needed which avoids or mitigates the inefficiencies described above.

BRIEF SUMMARY OF THE PREFERRED
EMBODIMENTS OF THE INVENTION

The preferred embodiments of the present invention solve the problems noted above by providing a network comprising a plurality of interconnected switches that implements an improved topology database synchronization technique. The technique involves each switch detecting a newly formed physical connection to a neighboring switch and only transmitting the switch's topology database to the neighboring switch if the database has not already been provided to the neighboring switch. When a new physical connection is detected over one of the local switch's ports to a neighboring switch, the local switch determines whether any of its other ports have already been connected to the same neighboring switch. If no other port on the local switch has been connected to the neighboring switch, the local switch transmits its topology database to the neighboring switch. If the local switch determines that, in fact, it has already been connected to the neighboring switch via another one of its ports, it is assumed that the local switch's topology database has already been provided to the neighboring switch. As such, the local switch does not copy yet again the database to the neighboring switch.

The determination as to whether another port has already been connected to the neighboring switch can be made by examining the state of the ports on the local switch. For example, the local switch examines its ports for a port that is in a state permitting normal network traffic to be routed through the local switch to the neighboring switch. A port in such as state indicates that the switch's topology database has already been provided to the neighboring switch. To provide backward compatibility with conventional switches which, upon detecting a newly formed link, await a topology database exchange, each switch in the preferred embodiment transmits a frame indicating the end of a database exchange frame despite not actually having transmitted the topology database.

In conventional networks, once a switch has updated a link state record to reflect a newly established inter-switch link, the updated link state record is transmitted on all inter-switch links to all other neighboring switches. In accordance with the preferred embodiment of the invention, however, once a switch has updated a link state record, the switch transmits the updated link state to each neighboring switch via only one inter-switch link. With regard to each neighboring switch, the local switch preferably chooses one of its ports to be a "master" port for transmission of the updated link state record. If the selected master port ceases to be usable for routing network traffic, the local switch selects another port to be the master with respect to the affected neighbor. Among the available remaining ports connected to the neighboring switch, the replacement master may be selected as the port having the lowest, or highest, port number.

The topology database synchronization process described herein is more efficient and uses less network resources than previous synchronization techniques. These and other aspects and benefits of the preferred embodiments of the present invention will become apparent upon analyzing the drawings, detailed description and claims, which follow.

BRIEF DESCRIPTION OF THE DRAWINGS

For a detailed description of the preferred embodiments of the invention, reference will now be made to the accompanying drawings in which:

FIG. 2 shows an exemplary embodiment of a link state record usable in each switch;

FIG. 3 depicts a conventional topology database synchronization process;

FIG. 4 depicts a topology database synchronization process in accordance with the preferred embodiment of the invention; and FIG. 5 shows a more detailed embodiment of the process depicted in FIG. 4.

NOTATION AND NOMENCLATURE

Figure 1:
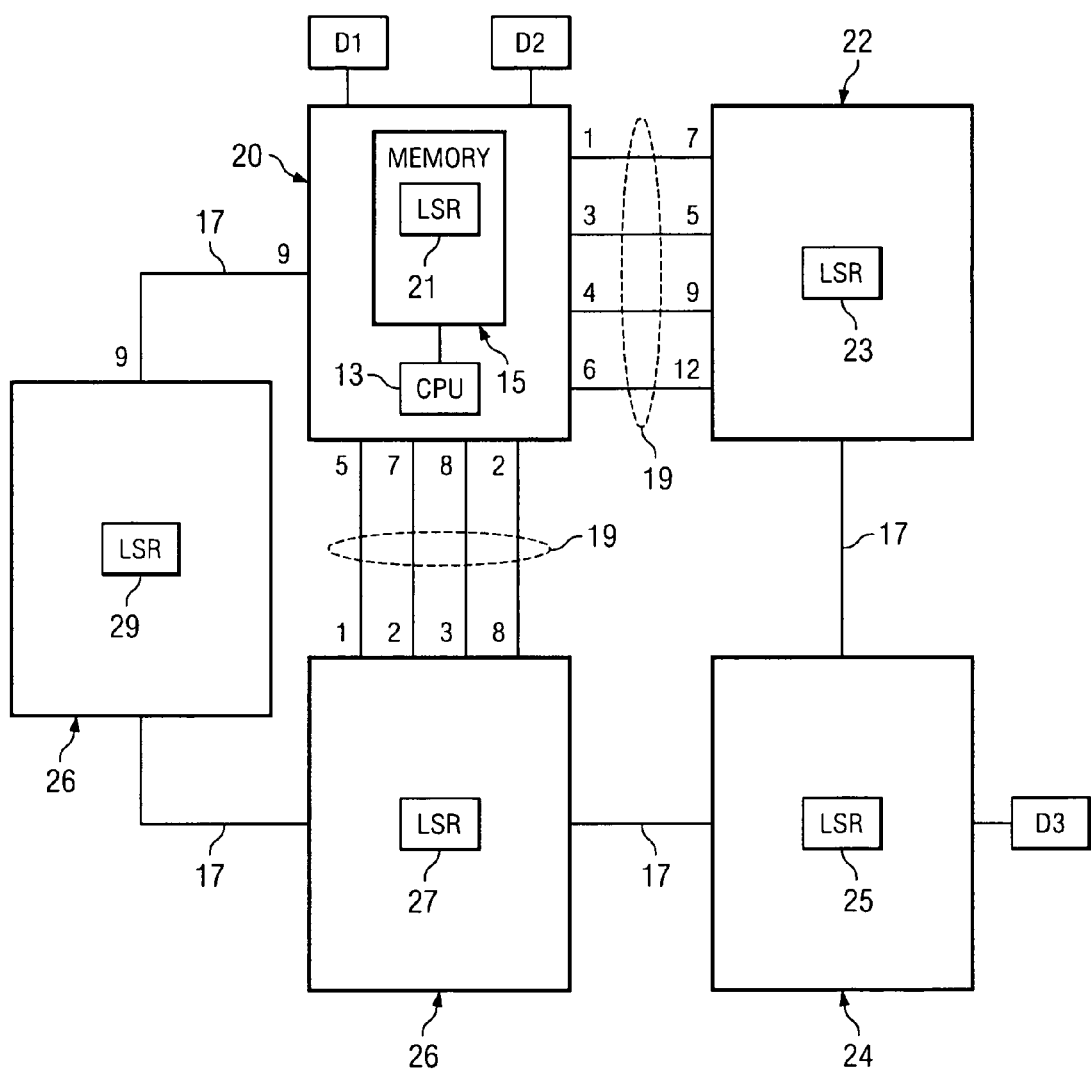
FIG. 1 shows a network comprising a plurality of interconnected switches.

Certain terms are used throughout the following description and claims to refer to particular system components. As one skilled in the art will appreciate, computer and computer-related companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect electrical connection. Thus, if a first device couples to a second device, that connection may be through a direct electrical connection, or through an indirect electrical connection via other devices and connections.

The present disclosure uses the terms "local," "remote," and "neighboring" to refer to switches in the network. These terms are not intended to impart any particular limitations on the switches. Instead, these terms are simply intended to provide antecedent basis for discussing switches in the network to make the discussion clearer when discussing a switch in relation to a neighboring switch. As such, when discussing the operation of switch, that switch is referred to as the "local" switch and switches connected to the local switch are referred to as "neighboring" or "remote" switches. The terms "neighboring" and "remote" thus are used synonymously in this disclosure.

To the extent that any term is not specially defined in this specification, the intent is that the term is to be given its plain and ordinary meaning.

DETAILED DESCRIPTION OF THE PREFERRED EMBODIMENTS

The following discussion is presented in the context of network switches. It should be understood, however, that the principles disclosed herein also apply to routers, switches and other types of network devices.

Referring now to FIG. 4, in accordance with the preferred embodiment of the invention, an improved network topology process is shown as steps 50-56. Much of the functionality described below is performed by each switch's CPU. The improved process is particularly beneficial when multiple ISLs are formed between a pair of neighboring switches. In step 50, the first ISL formed between the pair of switches performs the HELLO, or equivalent, protocol and the switch's topology databases are exchanged, generally as described above. In step 52, for all subsequent ISLs formed between the same pair of switches, the switches perform the HELLO protocol to determine the domain and port number used by the neighbor for the newly formed ISL. However, because the switches' topology databases have already been exchanged (step 50), the database exchange action preferably is bypassed. In this way, the new ISLs are able to be brought up to the FULL state (step 54) much faster and the synchronization process requires less operational involvement from the switch and less network resources. Each switch then updates its own LSR as shown in step 56.

A more detailed implementation of the process of FIG. 4 is shown in FIG. 5. Other implementations are possible as well and should be considered within the scope of this disclosure. Referring to FIG. 5, a switch detects a new physical connection over one of its ports to a neighboring switch (step 60). The switch then begins the HELLO protocol in step 62. Once the neighboring switch also begins its HELLO protocol and the switches have successfully exchanged their connectivity information regarding the newly formed ISL (step 64), each switch determines in step 66 whether another ISL has already been formed between the same pair of switches. This determination can be made, for example, by determining the state of other ports on the local switch. The local switch preferably examines its ports to determine if a port exists that is in a state which permits normal network traffic to be routed. An exemplary state in Fibre Channel networks that is indicative of this condition is the FULL state. The state of each port is maintained in memory (not specifically shown) in each switch and is easily accessed to make the determination of step 66. It is assumed that, if another port is connected to the neighboring switch and is in a state that permits the routing of network traffic, then the switch's topology database has already been provided to the neighboring switch and thus need not be copied again.

If no other port on the local switch is connected to the neighboring switch and in the FULL state, then it is assumed that the switch's topology database has not been transferred to the neighboring switch. Accordingly, steps 68-74 are performed to exchange the topology database (68), exchange frames indicating the end of the topology database exchange (70), transition the new ISL to the FULL state (72), and update the switch's LSR with connectivity information from the newly formed ISL.

If, however, it is determined in step 66 that another ISL has already been formed between the same pair of switches and such ISL is in the FULL state, then it is assumed that the switch's topology database has already been transferred to the neighboring switch. Accordingly, the database exchange steps 68 and 70 preferably are bypassed to avoid unnecessarily re-copying the database. At this point, control can continue at step 72 in which the new ISL is transitioned to the FULL state followed by updating the LSR (step 74).

In order to maintain "backward compatibility" with switches that do not implement the improved topology database synchronization, control may bypass step 68 but continue with step 70 as indicated by the dashed line in FIG. 5. In step 70, the switch, having determined that transferring a copy of its topology database to the remote switch is unnecessary, transmits a frame to the neighboring switch that indicates the end of the topology database exchange. By transmitting the end of database exchange frame, even though the database itself is not transferred, the remote switch, which may be waiting for the end of the database exchange frame, is permitted to continue with its operation.

In conventional fabric switches, once a switch's LSR is updated (e.g., step 42 in FIG. 3), the new LSR is propagated to other neighboring switches over all other ISLs. For example, with regard to FIG. 1 after switch 20 adds an LSR to reflect a new ISL between switches 20 and 22, the new LSR is transmitted to switch 26 via port 9 and switch 28 via ports 5, 7, 8 and 2. As such, the same LSR information may be transmitted multiple times to the same neighboring switch if multiple ISLs exist to such neighboring switch. This inefficiency results from (1) needing to transmit the new LSR to each neighboring switch, and (2) implementing each output port on a switch with the same state machine. That is, if one port is designed to propagate a new LSR, all ports are designed to propagate the LSR.

In accordance with the preferred embodiment of the invention, once a switch's LSR is updated to include the description of a new ISL (e.g., step 74 in FIG. 5), that new LSR is propagated to each neighboring switch preferably over only one ISL connected to the neighboring switch. With respect to FIG. 1, this means that switch 20 will transmit the updated LSR to switch 26 via only one output port 5, 7, 8 or 2. This intelligent LSR propagation technique is more efficient and consumes less system bandwidth than for conventional implementations.

Propagating the LSR entry over only one of multiple ISLs between neighboring switches requires one of the ports to be selected for this function. In accordance with one embodiment of the invention, the first ISL that is established (i.e., in the FULL state) from a switch's output port to a neighboring switch is considered by the switch to be the "master." All subsequently established ISLs to the same neighbor are considered to be "slaves." Thus, when the switch needs to transmit a new LSR entry to the neighbor, the LSR is transmitted over only the master ISL. If the master ISL becomes unusable for network communications for some reason, a new master is selected. Among the remaining ISLs to the neighbor, the lowest numbered port of the local switch preferably is selected as the new master. For example, with respect to switch 26, if port 7 currently is the master and the ISL between port 7 of switch 20 and port 2 of switch 26 becomes unusable, then port 2 of switch 20 becomes the new master for the purpose of propagating LSR updates. Of course, if only one port/ISL exists when a master ISL becomes unusable, then of course that one remaining port is used to transmit LSR updates. Other techniques for selecting a replacement master are possible as well. For example, selecting the highest numbered port, rather than the lowest numbered port, is an acceptable technique. Also, the master itself can be selected through alternate techniques like using the lowest port number to be the master (instead of using the first port that is usable for network traffic).

As discussed above, an improved topology database synchronization technique is provided which reduces the inefficiencies associated with conventional database synchronization techniques. Broadly, as little topology database information as possible is transmitted between switches. This feature is more complex to implement than conventional synchronization techniques, which blindly propagate the database information on each and every ISL, but results in a more efficient system that places less of a burden on network resources such as bandwidth.

The above discussion is meant to be illustrative of the principles and various embodiments of the present invention. Numerous variations and modifications will become apparent to those skilled in the art once the above disclosure is fully appreciated. It should be understood, for example, that, as explained above, the functionality of the network device (e.g., switch, router, gateway) can be implemented as software instructions stored on a storage medium and executed by a processor in the network device. It is intended that the following claims be interpreted to embrace all such variations and modifications.

What is claimed is:

1. A method of synchronizing topology databases in a network comprising a plurality of switches interconnected by inter-switch links, the method including:
   (a) detecting a physical connection between a port on a local switch and a first neighboring switch;
   (b) determining whether another port on the local switch has already been connected to the first neighboring switch; and
   (c) if no other port on the local switch is already connected to the first neighboring switch, transmitting the local switch's topology database to the first neighboring switch; or
   (d) if another port on the local switch is already connected to the first neighboring switch over which the local switch's topology database was previously transmitted, not transmitting the local switch's topology database to the first neighboring switch over the physical connection detected in (a).

2. The method of claim 1 wherein (c) and (d) include transmitting a frame to the first neighboring switch indicating an end of a topology database exchange sequence.

3. The method of claim 1 wherein (b) includes determining whether another port on the local switch is in a state permitting the port to be used to transmit network traffic.

4. The method of claim 1 wherein, before performing (b), transmitting connectivity information to said first neighboring switch.

5. The method of claim 1 further including updating a link state record for each new inter-switch link and transmitting said updated link state record to a second neighboring switch via only one of a plurality of local switch ports connected to said second neighboring switch.

6. The method of claim 5 further including selecting one of said plurality of local switch ports to be a master and transmitting said updated link state record via said master port to said second neighboring switch.

7. The method of claim 6 further including selecting another of said plurality of local switch ports to be a replacement master if said previously selected master port becomes unusable to transmit network traffic.

8. The method of claim 7 wherein each port is assigned a unique number and selecting another of said plurality of local switch ports to be the replacement master includes selecting, among the remaining local switch ports, a port having the lowest port number.

9. The method of claim 7 wherein each port is assigned a unique number and selecting another of said plurality of local switch ports to be the replacement master includes selecting, among the remaining local switch ports, a port having the highest port number.

10. A network, comprising:
    a plurality of interconnected switches including a local switch connected to a first neighboring switch;

each of said switches including a plurality of ports usable to connect to other switches and a topology database indicating the connection between switches in the network;

wherein, when said local switch detects an electrical connection over one of its ports to said first neighboring switch, and said local switch:

determines whether another port is already connected to said first neighboring switch; and if the local switch does not include another port already connected to said first neighboring switch, said local switch transmits its topology database to said first neighboring switch; or if the local switch does include another port already connected to said first neighboring switch, said local switch does not transmit its topology database to said first neighboring switch.

11. The network of claim 10 wherein, regardless of whether the local switch includes another port already connected to said first neighboring switch, said local switch transmits a frame to the first neighboring switch indicating an end of a topology database exchange sequence.

12. The network of claim 10 wherein the determination made by said local switch as to whether another port is already connected to said first neighboring switch includes determining whether another port on the local switch is in a state permitting such port to be used to transmit network traffic.

13. The network of claim 10 wherein said local switch electrically connects to a second neighboring switch via a first plurality of ports and wherein said local switch updates a link state record for each new link established to said first neighboring switch and transmits said updated link state record to the second neighboring switch via only one of said first plurality of ports.

14. The network of claim 13 wherein said local switch selects one of said first plurality of ports to be a master and transmits said updated link state record via said master port.

15. The network of claim 14 wherein said local switch selects another of said first plurality of ports to be a replacement master if said previously selected master port becomes unusable to transmit network traffic.

16. The network of claim 15 wherein each of said first plurality of ports is assigned a unique number and said local switch selects a replacement master by selecting another of said plurality of ports having the lowest port number.

17. The network of claim 15 wherein each of said first plurality of ports is assigned a unique number and said local switch selects a replacement master by selecting another of said plurality of ports having the highest port number.

18. A network device, comprising:

a CPU;

a plurality of ports usable to connect to other network devices;

memory coupled to said CPU and including a topology database;

wherein, when said CPU is adapted to detect an electrical connection over one of its ports to a first neighboring switch, said CPU:

is adapted to determine whether another port is already connected to said first neighboring switch; and if the network device does not include another port already connected to said first neighboring switch, said CPU is adapted to transmit the topology database to said first neighboring switch; or if the network device does include another port already connected to said first neighboring switch, said CPU does not transmit the topology database to said first neighboring switch.

19. The network device of claim 18 wherein, regardless of whether the network device includes another port already connected to said first neighboring switch, said CPU is adapted to transmit a frame to the first neighboring switch indicating an end of a topology database exchange sequence.

20. The network device of claim 19 wherein the determination made by said CPU as to whether another port is already connected to said first neighboring switch includes determining whether another port on the network device is in a state permitting such port to be used to transmit network traffic.

21. The network device of claim 18 wherein said network device is configured to electrically connect to a second neighboring switch via a first plurality of ports and wherein said CPU is adapted to update a link state record for each new link established to said first neighboring switch and transmit said updated link state record to the second neighboring switch via only one of said first plurality of ports.

22. The network device of claim 21 wherein said CPU is adapted to select one of said first plurality of ports to be a master and transmit said updated link state record via said master port.

23. The network device of claim 22 wherein said CPU is adapted to select another of said first plurality of ports to be a replacement master if said previously selected master port becomes unusable to transmit network traffic.

24. The network device of claim 23 wherein said CPU assigns a unique number to each of said first plurality of ports and selects a replacement master by selecting another of said plurality of ports having the lowest port number.

25. The network device of claim 23 wherein said CPU assigns a unique number to each of said first plurality of ports and selects a replacement master by selecting another of said plurality of ports having the highest port number.

26. A computer readable storage medium for storing an executable set of software instructions that are executable by a processor, said software instructions being operable to synchronize topology databases in a network comprising a plurality of switches interconnected by inter-switch links, comprising:

(a) means for detecting an electrical connection between a port on a local switch and a first neighboring switch;

(b) means for determining whether another port on the local switch has already been connected to the first neighboring switch; and (c) if no other port on the local switch is already connected to the first neighboring switch, means for transmitting the local switch's topology database to the first neighboring switch; or (d) if another port on the local switch is already connected to the first neighboring switch over which the local switch's topology database was previously transmitted, means for not transmitting the local switch's topology database to the first neighboring switch over the electrical connection detected in (a).

27. The computer readable storage medium of claim 26 wherein (c) and (d) include means for transmitting a frame to the first neighboring switch indicating an end of a topology database exchange sequence.

28. The computer readable storage medium of claim 26 wherein (b) includes means for determining whether another port on the local switch is in a state permitting the port to be used to transmit network traffic.

29. The computer readable storage medium of claim 26 further including a means for updating a link state record for each new inter-switch link and for transmitting said updated link state record to a second neighboring switch via only one of a plurality of local switch ports connected to said second neighboring switch.

* * * * *